(No Model.) 2 Sheets—Sheet 2.
A. W. FRAIL.
CARBURETING APPARATUS.
No. 264,406. Patented Sept. 12, 1882.
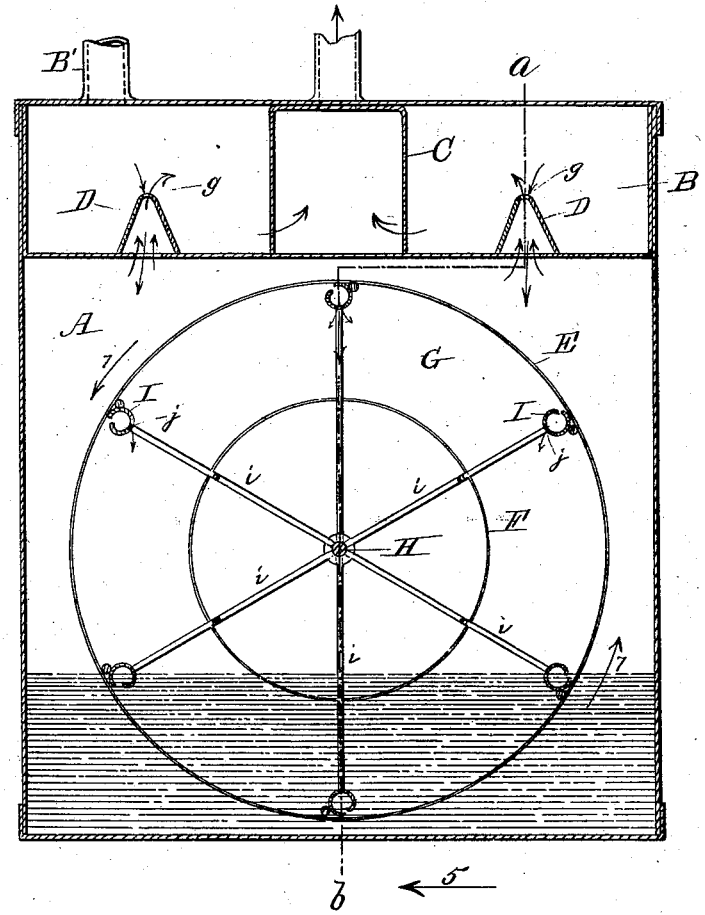
Witnesses;
Edwin E. Moore
John C. Dewey.
Inventor;
Aaron W. Frail.

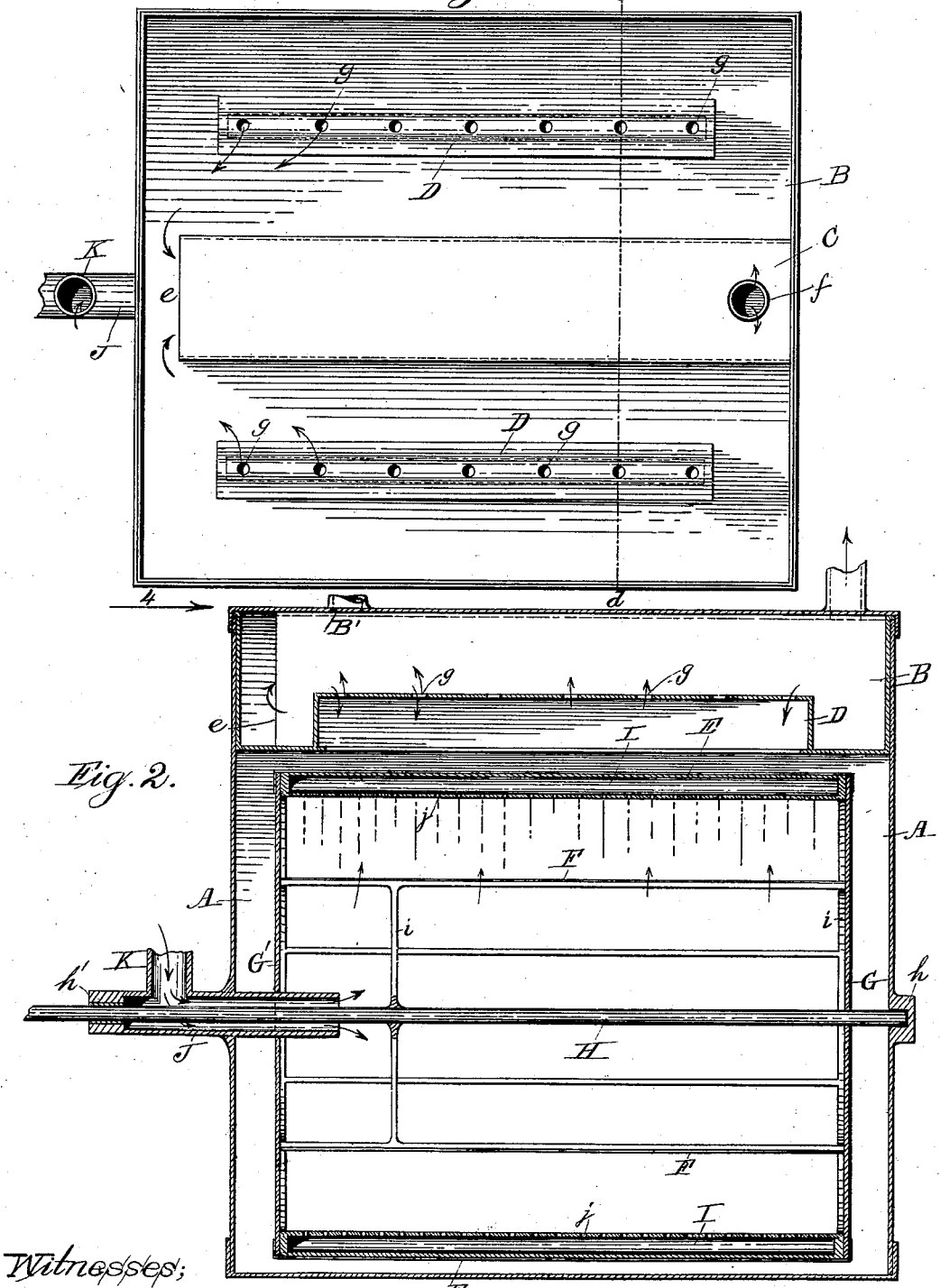

United States Patent Office.

AARON W. FRAIL, OF ASHLAND, MASSACHUSETTS, ASSIGNOR TO HIMSELF AND ALBERT WHITING EAMES, OF SAME PLACE.

CARBURETING APPARATUS.

SPECIFICATION forming part of Letters Patent No. 264,406, dated September 12, 1882.

Application filed March 18, 1882. (No model.)

*To all whom it may concern:*

Be it known that I, AARON W. FRAIL, of Ashland, county of Middlesex, and State of Massachusetts, have invented certain new and useful Improvements in Carbureting Apparatus; and I do hereby declare that the following is a full, clear, and exact description of the same, reference being had to the accompanying drawings, forming a part of this specification, and in which—

Figure 1 represents a top or plan view of my generating apparatus with top removed. Fig. 2 represents a vertical longitudinal section through my apparatus, taken at the point indicated by line $a\,b$, Fig. 3, looking in the direction of arrow 5, same figure; and Fig. 3 represents a vertical transverse section taken on line $c\,d$, Fig. 1, looking in the direction of arrow 4, same figure.

The nature of my invention consists in the generation of gas from gasoline or other volatile hydrocarbon, whereby the hydrocarbon is allowed to drop or run upon and through perforated or gauze cylinders, one cylinder being inclosed within the other, said cylinders being continually turned in a chamber or case, which I prefer to fill about one-fourth full of hydrocarbon, as hereinafter described, the outer cylinder being provided with buckets for taking up the liquid hydrocarbon from the chamber in which it revolves, as will be hereinafter described.

To enable those skilled in the art to which my invention belongs to make and use the same, I will proceed to describe it more in detail.

In the drawings, the part marked A represents the outer chamber or case, made of any desirable material, in which my carbureting apparatus is placed. This chamber I prefer to keep about one-fourth full of gasoline or other liquid hydrocarbon, as shown in Fig. 3 of the drawings.

The part B is a pan or receptacle, and is fitted into the upper part of the chamber A.

The part C is an inclosed chamber or box, made in the pan or receptacle B, open at one end, $e$, as shown in Figs. 1 and 2, and having a hole, $f$, in the top thereof, through which and through a corresponding hole in the top of the chamber A the eduction or gas-conveying pipe passes, as shown in Figs. 1 and 3.

The hoods D are raised portions upon the bottom of the pan or receptacle B, having holes or openings $g$ along their upper parts, as shown in the drawings, for the gradual flow downward, as will be hereinafter described, of the gasoline or other liquid hydrocarbon, which is allowed to flow slowly into the receptacle B, and also for the escape upward of the carbureted air or gas from the chamber A.

In the chamber A are two perforated or gauze cylinders, E F, the cylinder F being within the cylinder E and secured within the same by extending arms, in any suitable manner, so that the two cylinders will always be in the same position relative to each other, and consequently revolve together.

G G' are the cylinder-heads, fastened securely on each end of the double cylinder.

H is a shaft running through the center of cylinder F, mounted in suitable bearings, $h\,h'$. Said shaft passes through the center of the cylinder-head G, and is firmly fastened to said cylinder-head. The arms $i$, extending out from shaft H, supporting the cylinder F in position, are securely fastened to the shaft, so that the shaft H, being revolved by any desired means, carries around with it the two cylinders E F.

The parts I are take-up or lifting buckets arranged upon the interior surface of the outer cylinder, E, as shown in Figs. 2 and 3. These buckets have perforations or openings $j$ in them, through which the gasoline or other liquid hydrocarbon (which is taken up from the chamber A as the cylinders revolve around) drops down upon the inner cylinder, F, as indicated in Fig. 2 of the drawings.

The part J represents an air-induction tube with branch pipe K. This tube is inserted through the side of the chamber A and fastened securely thereto. It also passes loosely through the cylinder-head G' and extends for a short distance within the cylinder F. At its other end it has a tubular bearing, $h'$, for supporting the shaft H. Through the pipe K and tube J air or gas is forced or pumped into the interior of the cylinder F, to be impregnated with gasoline or other hydrocarbon.

The operation of my improved carbureting apparatus is as follows: Gasoline or other liquid hydrocarbon is allowed to run slowly into the pan or receptacle B through a supply-pipe, B', from any suitable tank or reservoir, and from pan B to run into the chamber A through the perforations or openings g in the elevated portions D until the chamber A is about one-fourth full of liquid, the supply being regulated by a float-valve. The shaft H being revolved by any well-known means, the cylinders E and F are turned in the direction shown by arrow 7, Fig. 3. The buckets I are filled with the gasoline or other liquid hydrocarbon contained in the chamber A, and when they reach a certain elevation in the revolution of the cylinder E the liquid runs through the openings j in the buckets, falling upon the inner perforated cylinder, F, as indicated in Fig. 2 of the drawings. This operation is continually going on, and the gasoline or other liquid hydrocarbon is broken up, thereby facilitating the vaporizing operation thereof. While the above operation is going on air or gas is forced or pumped into the interior of the cylinder F through the supply-pipes K and J, and in passing through the vaporized gasoline or other hydrocarbon in its exit through the perforated or gauze cylinders and through the openings in the hoods D and into and through the chamber C becomes evenly and perfectly carbureted.

It will be understood by those skilled in the art that the lifting or distributing buckets I may be arranged upon the outside of the gauze or perforated cylinder E; but I prefer the arrangement of said buckets as shown in the drawings, since the fall of the gasoline or other liquid hydrocarbon upon the gauze or perforated cylinder F is attended, it is believed, with better results than would be the case if the buckets were allowed to empty themselves upon the outer surface of the perforated or wire-gauze cylinder E.

It may also be stated that good results can be obtained by dispensing with the outer perforated cylinder, E, leaving the buckets to occupy the same relative position to cylinder F as shown and described, the buckets in such cases being supported by a sufficient number of arms radiating from shaft H, and such buckets could be used with very fair results, even if both of the perforated or wire-gauze cylinders were omitted.

It will be observed that the liquid hydrocarbon, as it runs through the openings g in the elevated hoods D and drips or falls down, will be caught by the rotating perforated cylinder E, which tends, by breaking up the liquid, to facilitate the operation of carbureting the air.

By my improvements the carbureting apparatus can be made very compact and comparatively small, while at the same time the air or gas can be very evenly charged or carbureted, thereby rendering the apparatus very convenient and acceptable to the public.

I am aware that carbureting-machines have been provided with revolving buckets to raise gasoline and empty the same upon wire-gauze or other cylinders, through which air is forced by suitable means; and I do not claim broadly the use of elevating-buckets and wire-gauze cylinders in machines of this kind.

What I claim, and desire to secure by Letters Patent, is—

1. The combination of the bottom chamber, A, and perforated cylinder E therein, having a gas or air induction pipe in the axis thereof, and internal buckets, I, provided with a series of openings, j, with the removable pan B, having a central chamber, C, an eduction-pipe therefrom, and elevated hoods D, projecting from its bottom, substantially as and for the purpose described.

2. The combination of the bottom chamber, A, wire-gauze cylinder E, having an axial induction-pipe, J, perforated buckets I, and perforated cylinder F within the cylinder E, with upper pan, B, having an eduction-pipe, and perforated hoods D, projecting upward from the bottom of said pan, all arranged substantially as shown and described.

AARON W. FRAIL.

Witnesses:
EDWIN E. MOORE,
JOHN C. DEWEY.